United States Patent
Ghosh et al.

(10) Patent No.: US 10,475,032 B2
(45) Date of Patent: Nov. 12, 2019

(54) SYSTEMS AND METHODS FOR TOKENLESS AUTHENTICATION OF CONSUMERS DURING PAYMENT TRANSACTIONS

(71) Applicant: MASTERCARD INTERNATIONAL INCORPORATED, Purchase, NY (US)

(72) Inventors: Debashis Ghosh, Charlotte, NC (US); Randy Shuken, Westport, CT (US); Mary Elizabeth Lesbirel, Holmdel, NJ (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 15/880,742

(22) Filed: Jan. 26, 2018

(65) Prior Publication Data

US 2018/0150847 A1    May 31, 2018
US 2018/0365699 A9    Dec. 20, 2018

Related U.S. Application Data

(63) Continuation of application No. 14/066,246, filed on Oct. 29, 2013, now Pat. No. 9,904,921.

(51) Int. Cl.
*G06Q 40/00* (2012.01)
*G06Q 20/40* (2012.01)

(52) U.S. Cl.
CPC ... *G06Q 20/40145* (2013.01); *G06Q 20/4012* (2013.01)

(58) Field of Classification Search
CPC ................................................ G06Q 20/40145

USPC ............ 705/44, 50, 18, 7.36, 348, 39; 379/202.01; 382/124; 380/229
See application file for complete search history.

(56) References Cited

U.S. PATENT DOCUMENTS

| | | | |
|---|---|---|---|
| 6,230,148 B1 * | 5/2001 | Pare, Jr. | G01F 19/005 380/229 |
| 6,269,348 B1 * | 7/2001 | Pare, Jr. | G01F 19/005 705/18 |
| 6,581,042 B2 | 6/2003 | Pare, Jr. et al. | |
| 6,662,166 B2 | 12/2003 | Pare, Jr. et al. | |
| 6,879,966 B1 | 4/2005 | Lapsley et al. | |
| 6,920,435 B2 | 7/2005 | Hoffman et al. | |

(Continued)

*Primary Examiner* — Samica L Norman
(74) *Attorney, Agent, or Firm* — Armstrong Teasdale LLP (57) ABSTRACT

A computer-implemented method for tokenless authentication of a paying consumer during a payment transaction uses a computing device having a processor and a memory. The method includes receiving a plurality of biometric data sets for a plurality of consumers. Each biometric data set includes at least a biometric image of a consumer and an associated payment account identifier. The method also includes receiving, from a first biometric input device communicatively coupled to the processor, a first biometric image of the paying consumer including an iris image. The method further includes determining a payment account associated with the paying consumer based on at least the first biometric image and the plurality of biometric data sets. The method also includes authenticating use of the payment account by the paying consumer for a payment transaction at the retail location by comparing the first biometric image to the plurality of biometric data sets.

20 Claims, 8 Drawing Sheets

(56) References Cited

U.S. PATENT DOCUMENTS

| | | | |
|---|---|---|---|
| 7,536,352 B2 | 5/2009 | Lapsley et al. | |
| 7,606,401 B2 * | 10/2009 | Hoffman | C07K 14/53 382/124 |
| 7,882,032 B1 * | 2/2011 | Hoffman | G06F 21/6218 705/50 |
| 7,970,678 B2 | 6/2011 | Lapsley et al. | |
| 8,200,708 B2 | 6/2012 | Ghosh et al. | |
| 8,260,716 B2 | 9/2012 | Hoffman et al. | |
| 8,463,710 B2 | 6/2013 | Hoffman et al. | |
| 8,489,887 B1 * | 7/2013 | Newman | H04L 12/1818 379/202.01 |
| 2001/0000535 A1 | 4/2001 | Lapsley et al. | |
| 2002/0019811 A1 * | 2/2002 | Lapsley | G06Q 20/02 705/44 |
| 2002/0147600 A1 * | 10/2002 | Waters | G06Q 20/04 705/39 |
| 2005/0203841 A1 | 9/2005 | Hoffman et al. | |
| 2007/0288320 A1 * | 12/2007 | Cooper | G06Q 10/067 705/348 |
| 2014/0188568 A1 * | 7/2014 | Margolin | G06Q 10/0637 705/7.36 |

* cited by examiner

SYSTEMS AND METHODS FOR TOKENLESS AUTHENTICATION OF CONSUMERS DURING PAYMENT TRANSACTIONS

CROSS REFERENCE TO RELATED APPLICATIONS

This application is a continuation application of U.S. patent application Ser. No. 14/066,246, filed Oct. 29, 2013, entitled "SYSTEMS AND METHODS FOR TOKENLESS AUTHENTICATION OF CONSUMERS DURING PAYMENT TRANSACTIONS", the disclosure of which is hereby incorporated by reference in its entirety.

BACKGROUND OF THE DISCLOSURE

This disclosure relates generally to consumer transactions and, more particularly, to systems and methods for tokenless authentication of consumers during payment transactions when the consumer is physically present at a merchant location.

During retail transactions conducted at a merchant location, such as a "walk-in" storefront location, a paying consumer may wish to make a purchase with a payment card account, such as with a credit card, a debit card, a pre-paid card, etc. To execute a transaction, the consumer presents the physical payment card to the merchant at the time of purchase. The physical card identifies the particular payment account to be used during the transaction. The merchant (and other parties affiliated with the transaction) may presume that the underlying payment account is controlled by the consumer based on the consumer's demonstrated possession of the physical card (i.e., this person has the card, so the card must be theirs). However, physical cards may become lost, stolen, counterfeited, or otherwise abused by fraudulent third-parties. As such, possession of the payment card may not be a reliable indicator of underlying control or ownership of the payment account.

Secure execution of these payment account transactions require determining what underlying payment account to use for the transaction (i.e., account identification), as well as verifying that the consumer is authorized to use the underlying payment account (i.e., consumer authentication).

BRIEF DESCRIPTION OF THE DISCLOSURE

In one aspect, a computer-implemented method for tokenless authentication of a paying consumer during a payment transaction is provided. The method uses a computing device having a processor and a memory. The method includes receiving, in the memory, a plurality of biometric data sets for a plurality of consumers. Each biometric data set includes at least a biometric image of a consumer and an associated payment account identifier. The method also includes receiving, from a first biometric input device communicatively coupled to the processor, a first biometric image of the paying consumer. The first biometric image includes an iris image of the paying consumer. The method further includes determining a payment account associated with the paying consumer based on at least the first biometric image and the plurality of biometric data sets. The method also includes authenticating use of the payment account by the paying consumer for a payment transaction at the retail location by comparing the first biometric image to the plurality of biometric data sets.

In another aspect, a computing system for authenticating a paying consumer at a retail location is provided. The computing system includes a memory comprising a plurality of biometric data sets for a plurality of consumers. Each biometric data set includes at least a biometric image of a consumer and an associated payment account identifier. The computing system also includes a first biometric input device configured to capture a first biometric image of the paying consumer. The first biometric image includes an iris image of the paying consumer. The computing system further includes a processor communicatively coupled to the memory and the first biometric input device. The processor is programmed to determine a payment account associated with the paying consumer based on at least the first biometric image and the plurality of biometric data sets. The processor is also programmed to authenticate use of the payment account by the paying consumer for a payment transaction at the retail location by comparing the first biometric image to the plurality of biometric data sets.

In yet another aspect, a computing system for authenticating a paying consumer at a retail location is provided. The computing system includes a memory including a plurality of biometric data sets for a plurality of consumers. Each biometric data set includes at least a biometric image of a consumer and an associated payment account identifier. The computing system also includes a processor communicatively coupled to the memory and the first biometric input device. The processor is programmed to receive a first biometric image of the paying consumer from a biometric input device. The first biometric image includes an iris image of the paying consumer. The processor is also programmed to associate the paying consumer with a payment account using at least the first biometric image and the plurality of biometric data sets. The processor is further programmed to authenticate use of the payment account by the paying consumer for a payment transaction at the retail location by comparing the first biometric image to the plurality of biometric data sets.

In still another aspect, a computer-readable storage media having computer-executable instructions embodied thereon is provided. When executed by at least one processor, the computer-executable instructions cause the processor to receive a plurality of biometric data sets for a plurality of consumers. Each biometric data set includes at least a biometric image of a consumer and an associated payment account identifier. The computer-executable instructions also cause the processor to receive a first biometric image of the paying consumer upon the paying consumer entering a retail location. The first biometric image includes an iris image of the paying consumer. The computer-executable instructions further cause the processor to associate the paying consumer with a payment account using at least the first biometric image and the plurality of biometric data sets. The computer-executable instructions also cause the processor to authenticate use of the payment account by the paying consumer for a payment transaction at the retail location by comparing the first biometric image to the plurality of biometric data sets.

BRIEF DESCRIPTION OF THE DRAWINGS

FIGS. 1-8 show example embodiments of the methods and systems described herein.

DETAILED DESCRIPTION OF THE DISCLOSURE

The methods and systems described herein include tokenless authentication of consumers during transactions in which the consumer is physically present at a merchant location. The methods and systems described herein facilitate enabling a consumer to complete a transaction without use of a physical payment card (i.e., a "token" that identifies the underlying payment account such as, for example, a physical plastic credit card or debit card) in a manner such that the consumer account (i.e., payment account) is strongly authenticated to protect against fraud.

In the example embodiments described herein, the consumer is both identified and authenticated using an iris scan and a passcode. A consumer pre-registers a personal "master" iris scan of the consumer's own iris. The master iris scan is associated with the consumer's payment card account. At a merchant retail location, such as a merchant's "brick-and-mortar" store, the merchant positions an iris scanner at, for example, the entrance to the store. As the consumer walks into the store, the iris scanner captures a "target" iris scan of the consumer. The system compares the target iris scan to a database of many "master" iris scans and matches the target scan with a particular master iris scan of the consumer. Because iris scans are widely considered to be reliably unique (i.e., presenting a very low rate of false matches), the match of the target iris scan to the master iris scan serves to both identify a particular consumer's account and to partially authenticate use of the account. The consumer's physical presence, verified by biometrics, helps verify that the cardholder is at the location where the account is being used.

It may not be enough, however, to know that a consumer is present at the store location in order to confidently authenticate any transaction with that consumer's underlying account. At the time of purchase, an account for a given transaction may still require a further identification of the person standing at the point of sale. In some embodiments, a second stage of authentication is also used at the point of sale. The system maintains a list of consumers that are present within the store (from the first "target" iris scan as consumers enter the store). When a person approaches a point of sale device, such as a computerized cash register, a list of present consumers is displayed to, for example, a salesperson, or the consumer herself. The list may include photographic pictures or other information easily identifiable by the consumer and/or salesperson. The list entry for the particular person at the point of sale is selected, thus identifying the payment account to be used. Further, the person at the point of sale is prompted for a passphrase such as, for example, a password or security code known only by the true authorized consumer. If verified by this second tier of authentication, the consumer's payment transaction is authorized and completed. As such, early capture of the consumer's iris images (i.e., upon the consumer's entry to the store) allows the system to identify the consumer prior to the time of the transaction. Further, the consumer may perform a payment account transaction without use of a token (i.e., a tokenless transaction), and under several layers of authentication provided by the system.

As used herein, the term "token" refers generally to a physical, portable item that a consumer may use to conduct a payment transaction. Some examples of common tokens used in conducting payment transactions include credit cards, debit cards, pre-paid cards, smart cards, and paper checks. Such tokens are often personalized with information specific to a particular consumer and that consumer's payment account, such as printing of the customer's name and/or payment account number on the token, or storing of consumer information within a storage media contained within or on the token. Accordingly, the term "tokenless" as used herein refers to conducting payment transactions without the use of a token (i.e., without the presence of a physical plastic card or similar device). Systems and methods are described herein that facilitate conducting in-person transactions without tokens (i.e., tokenless payment transactions, tokenless identification of payment accounts, and tokenless authentication).

As used herein, the term "biometric data" refers generally to the field of biometrics or biometric identification/authentication, in which characteristics or traits of humans are captured and analyzed, often for distinguishing one individual from another using a uniqueness of the characteristics or traits captured. Some examples of biometric data include fingerprints, DNA, facial images, retinal images, iris images, and voice images. Accordingly, the term "biometric input device" includes any device which facilitates the sampling of biometric data from humans. In the example embodiments, the biometric data sampled from consumers includes iris scans, and the biometric input device includes, for example, an iris recognition system. In some embodiments, the biometric input device collects biometric data (i.e., samples) and transmits the data to other system components for analysis. In other embodiments, the biometric input device collects biometric data and performs comparisons against other images to identify match candidates.

Also as used herein, the terms "master," "master image," and "master sample," as they are applied to biometric data, refer to an image sampled from the consumer and placed on file with the consumer's payment account information, a process which is normally performed during account setup or through a registration aspect with respect to enablement of biometric identification for the payment account. This master image is used as the image to which other captured images will be compared. For example, a consumer may register his/her biometric image and place it on file with their payment account information by having one or more of their iris's scanned (e.g., at a bank) and stored as a master image for later use. Later, the consumer may use their payment account, and may again have their iris scanned at a point of sale (e.g., in the store). This later image, referred to herein as a "target image," is then compared against the master image during biometric identification. As such, the master image is used as the image against which other target images are compared.

As used herein, the term "authentication" refers generally to the process of verifying the identity of a person and, more particularly, that a particular person is associated with a particular payment account. Authentication is not necessarily a discrete result, such as "yes this person is Bob Smith," or "no this person is not Bob Smith." Rather, authentication is a process that leads toward a higher confidence level that the person is a particular cardholder. The systems and methods described herein leverage aspects of biometrics to authenticate a person against a payment account in order to gauge whether or not the person is approved to use the payment account. A properly authenticated transaction allows a consumer and merchant to proceed with a payment transaction using the particular payment account.

As used herein, the term "point of sales (POS) device" is used broadly and generally to refer to any computing device having a processor present at a point of sale that may be used to perform a payment transaction and, more specifically, to authenticate a consumer during the payment transaction.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to payment account transactions.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
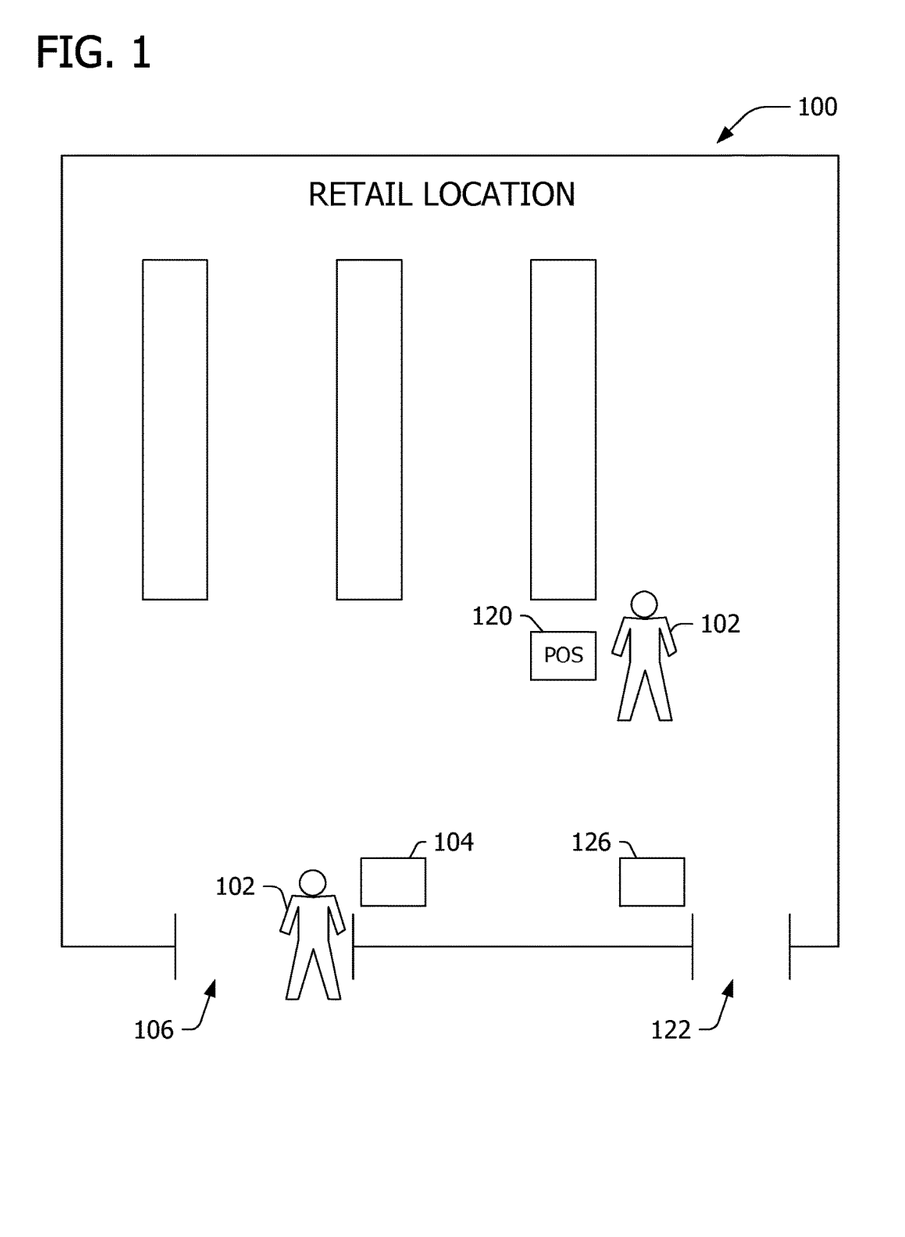
FIG. 1 is a diagram of an example retail setting in which a consumer may conduct a tokenless payment transaction with a merchant.

FIG. 1 is a diagram of an example retail setting 100 in which a consumer 102 may conduct a tokenless payment transaction with a merchant. In the example embodiment, retail setting 100 is a traditional place of business (i.e., a store) in which a merchant offers goods and/or services for sale or rent to consumers, such as consumer 102. Retail setting 100 includes a biometric input device 104 near an entrance 106 to the store, and positioned such that biometric data may be collected from customers 102 as they enter the store. In the example embodiment, biometric input device 104 is an iris scanner or iris recognition device positioned at a suitable distance and oriented at an angle such as to enable capture of iris images from customer 102 entering at entrance 106.

In the example embodiment, retail setting 100 also includes a point of sale (POS) device 120 near an exit 122 of the store. POS device 120 may include another biometric input device (not shown in FIG. 1), computing devices for executing payment transactions with consumers 102, and other computing devices configured to perform other aspects of the systems and methods described herein. Further, in some embodiments, another biometric input device 126 is positioned near exit 122 (i.e., within the capture range capabilities of the biometric input device) and oriented at an angle such as to enable capture of iris images from customer 102 leaving the store through exit 122. In the example embodiment, POS device 120 is communicatively coupled to one or more of biometric input device 104, biometric input device 126, and other computing systems (not shown in FIG. 1). In some embodiments, biometric input device 104 is not proximate to POS device 120, such as not within 10 feet of POS device 120.

During operation, in the example embodiment, consumer 102 enters retail setting 100 (i.e., store) through entrance 106. While entering, biometric input device 104 scans, for example, an iris image of consumer 102 (i.e., a biometric data sample of the consumer). In some embodiments, biometric input device 104 includes a database (not shown in FIG. 1) of "master" biometric data samples for a plurality of consumers, and biometric input device 104 searches for a match with the particular consumer 102 just scanned. In other embodiments, biometric input device 104 takes the iris image sample of consumer 102 and sends the image to another computing device, such as POS device 120 or a centralized server system (not shown in FIG. 1), for searching within the database. If a match is found, consumer 102 is identified to POS device 120 during a payment transaction as described in greater detail below in reference to FIGS. 2 and 3.

Further, in some embodiments, biometric input devices 104 and 126 are used to maintain a list of consumers that are currently present within retail setting 100. Consumers 102 are iris-scanned by biometric input device 104 as they enter the store at entrance 106, and they are added to the list. As consumers 102 exit the store at exit 122, consumers 102 are iris-scanned by biometric input device 126 as they exit the store at exit 122, and they are removed from the list. In some embodiments, a consumer may be removed automatically from the list after a predetermined period of time, thereby facilitating a timeout value for consumers that may have exited undetected, and may no longer be present within the store (such as exiting through an entrance or a fire escape). As such, the list can be used as a tool of authentication and verification, helping insure the merchant and/or other parties associated with payment transactions that a consumer of a payment account being used in a transaction is at least physically near the point of sale (i.e., inside the store). Further, scanning of consumers 102 at an early point in their store visit (i.e., when consumers 102 first pass through entrance 106) provides processing time to identify consumers 102 from their iris image scans prior to a transaction. In addition, in some embodiments, retailers or other parties to consumer transactions may quantify consumers, such as distinguishing between browsers and purchasers.

In some embodiments, no biometric input device 104 is present at entrance 106. Rather, the paying consumer 102 is scanned by a biometric input device 104 integrated within, or nearby, POS device 120 during the payment transaction. As such, paying consumer 102 may be first identified/scanned at the time of the payment transaction, and may further identify themselves using a secondary tokenless method, such as through entering a pin or a password.

Figure 2:
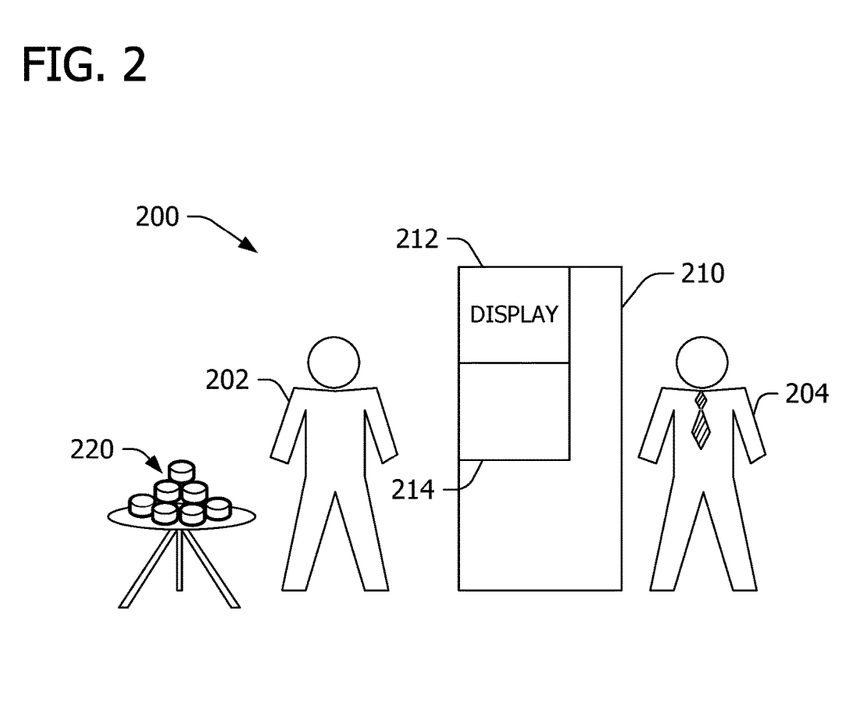
FIG. 2 is a diagram of another example retail setting in which the consumer conducts a tokenless payment transaction at a point of sale (POS) device shown in FIG. 1.

FIG. 2 is a diagram of another example retail setting 200 in which a consumer 202 conducts a tokenless payment transaction at a POS device 210. In some embodiments, retail setting 200 is similar to retail setting 100 (shown in FIG. 1), and POS device 210 is similar to POS device 120 (shown in FIG. 1). In the example embodiment, consumer 202 is near POS device 210, and has retail goods 220 for purchase. In some embodiments, an operator such as a salesperson 204 is also near POS device 120. POS device 120 includes a computing device (not separately shown) for performing payment transactions, such as a sales register. In some embodiments, POS device 210 is communicatively coupled to one or more of biometric input devices 104 and 126 (shown in FIG. 1), a merchant's system servers (not shown in FIG. 2), and one or more payment networks (not shown in FIG. 2). POS device 120 also includes a display device 212 and one or more input interfaces for interacting with POS device 120 during execution of payment transactions. In some embodiments, display 212 also functions as an input interface (such as through touch screen technology). Further, in some embodiments, POS device 120 also includes a biometric input device 214, which may be similar to or different than biometric input devices 104 and 126 (shown in FIG. 1). In some embodiments, biometric input device 214 is positioned proximate to POS device 120 such that biometric input device 214 is within capture range and oriented such as to allow biometric images of consumer 202 to be captured during a payment transaction. For example, biometric input device 214 may be positioned within 5 feet of POS device 214.

During operation, in the example embodiment, consumer 202 approaches POS device 210 intent on paying retail goods 220. POS device 210 has access to the list of consumers present within the merchant's store, as described above in reference to FIG. 1. In some embodiments, retail setting 200 is a self-service style retail setting and, as such, consumer 202 primarily interacts directly with POS device 210. In other embodiments, retail setting 200 is a traditional, salesperson-managed retail setting and, as such, salesperson 204 primarily interacts directly with POS device 210. In the example embodiment, POS device 210 presents the list of consumers on display device 212. The presented list contains identifying information for each consumer such that the particular consumer 202 present at the display can be identified from the list. For example, in some embodiments, a name of the consumer and/or a picture of the consumer appears. Consumer 202 and/or salesperson 204 visually searches through the list and selects the entry corresponding to consumer 202. Consumer 202 then inputs a passcode, such as a password or a security code associated with their payment account. The passcode operates as a second step of authentication, helping to insure that the consumer performing the payment transaction is actually the consumer chosen from the list. In some embodiments, biometric input device 214 may perform another iris capture, or a different biometric image capture of consumer 202 as the second step of authentication. This scan by biometric input device 214 can then just cause one picture or name to be displayed instead of a list of all those cardholders present in the store.

Further, in some embodiments, consumer 202 may be presented with a plurality of payment accounts. For example, if consumer 202 is associated with and registered to multiple payment accounts, the system may have access to multiple payment networks, or the consumer may otherwise have multiple biometrics-enabled payment accounts on file, and thus the iris search operation may reveal several matches. Accordingly, during execution of the payment transaction, consumer 202 may be presented with a choice of which payment account consumer 202 wishes to use.

Figure 3:
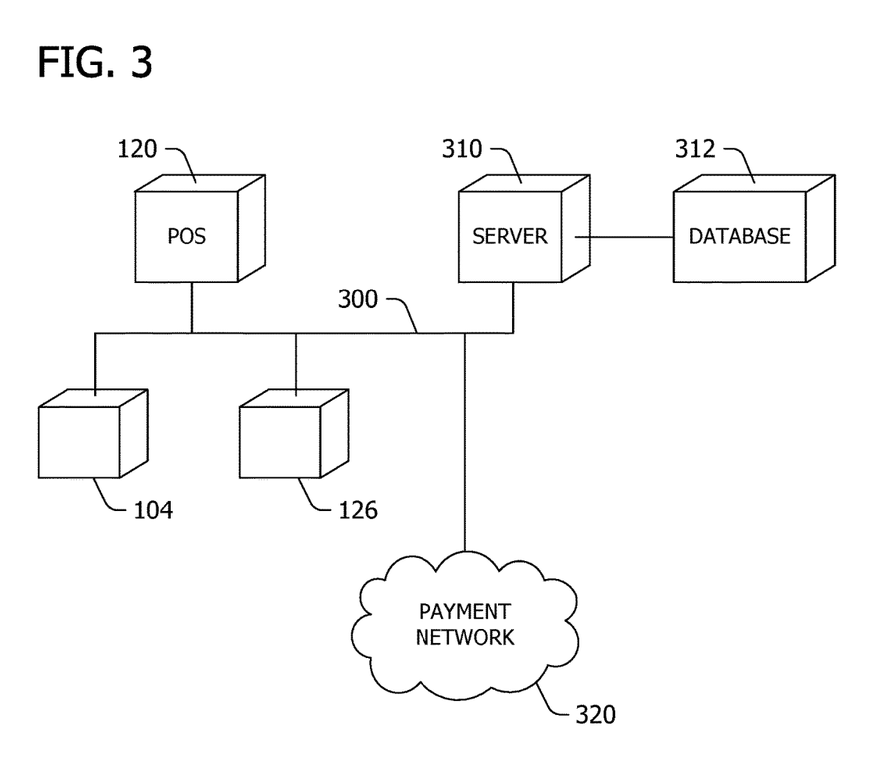
FIG. 3 is an example configuration of a computing network illustrating the computing devices shown in FIGS. 1 and 2 in communication with a backend system and a payment network.

FIG. 3 is an example configuration of a computing network 300 illustrating the computing devices shown in FIGS. 1 and 2 (e.g., biometric input devices 104 and 126, and POS device 120) in communication with a backend system 310 and a payment network 320. In the example embodiment, POS device 210 and biometric input devices 104 and 126 are communicatively coupled to system 310 and payment network 320 through computing network 300. In some embodiments, system 310 includes a database 312 that stores a plurality of biometric master samples for consumers.

During operation, in the example embodiment, system 310 receives iris scan samples (i.e., "target" iris images) from biometric input device 104, and builds and maintains the list of consumers present within the merchant's store. To perform this function, system 310 has access to a database of account information for consumers, such as database 312, including at least biometric "master" samples, such as iris images of various consumers, and account-identifying information, such as consumers' names and/or associated primary account numbers (PANs). Such biometric master samples are used to identify a particular target sample as consumers enter and/or exit the merchant's store. In the example embodiment, consumer 202 is scanned upon entering a store (i.e., a target image of consumer 202 is sampled), system 310 searches the master image database 312, and consumer 202 is identified based on an iris match to a master iris image for consumer 202. Once identified, the system adds consumer 202 to the list of consumers present. In the example embodiment, system 310 transmits the target image to payment network 320, payment network 320 scans a master image database similar to database 312 and, if a match is found, payment network 320 returns to system 310 any consumer information identified, such as consumer's 202 name and primary account number.

During consumer payment transactions, POS device 210 communicates with system 310 to retrieve the list of consumers present. POS device 210 is thereby able to retrieve and display identifying information for each consumer. System 312 includes or has access to the consumers' identifying information such as, for example, consumers' pictures and/or names. System 310 also includes or has access to each identified consumer's account information, including payment account number (i.e., the account number used to perform the transaction) and passcode/biometric image (i.e., the data used for the second tier of authentication). To facilitate the payment transaction, consumer 202 is identified and authenticated at POS device 210, which subsequently identifies the associated payment account number (i.e., PAN). That payment account number is then used by POS device 210 to complete the transaction. As such, consumer 202 has conducted a payment transaction with the merchant without the use of a physical token (i.e., without their payment card).

Figure 4:
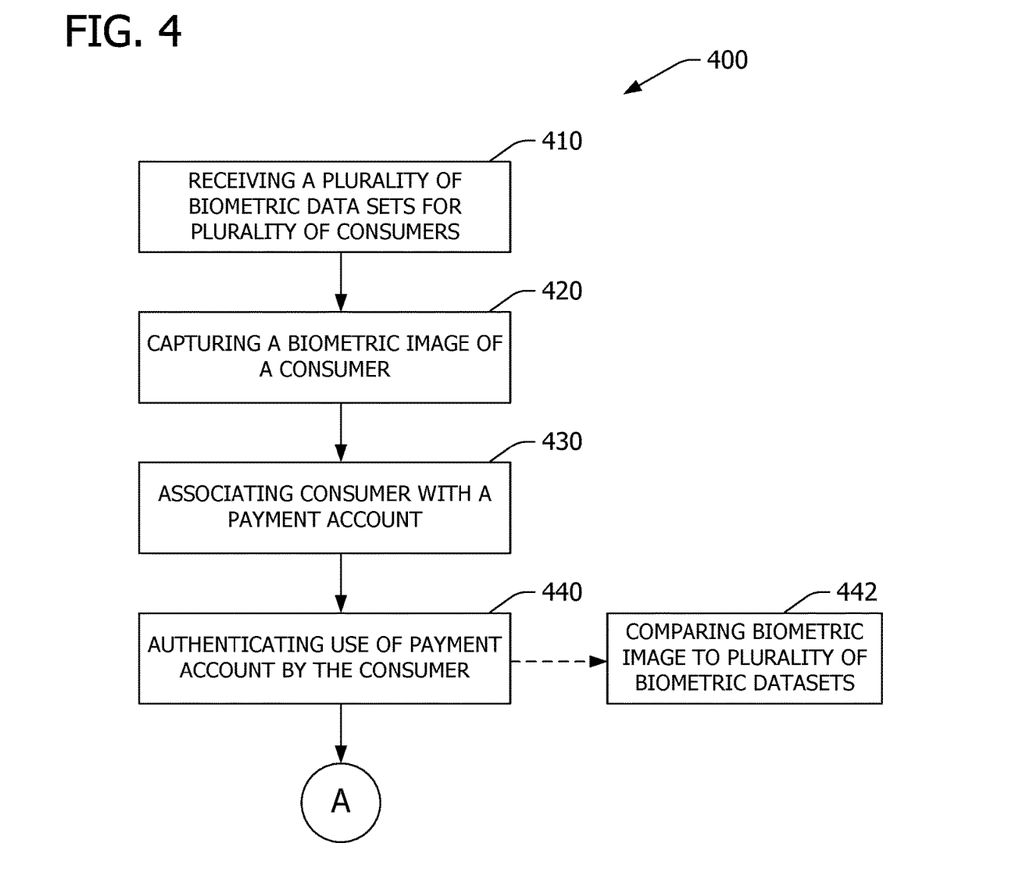
FIG. 4 is an example method for tokenless authentication of consumers during payment transactions implemented using the computing devices shown in FIG. 3.

FIG. 4 is an example method 400 for tokenless authentication of consumers during payment transactions implemented using the computing devices shown in FIGS. 1-3. In the example embodiment, method 400 uses a computing device such as POS device 210 (shown in FIG. 2) or the computing devices discussed in reference to FIG. 3. Method 400 includes receiving 410 a plurality of biometric data sets for a plurality of consumers, such as consumers 102 (shown in FIG. 1). Each biometric data set includes at least a biometric image (i.e., a "master image") of a consumer and an associated consumer account identifier that identifies a payment account of the consumer. Method 400 also includes capturing 420 a biometric image (i.e., a "target image") of the paying consumer (e.g., consumer 102, shown in FIG. 1) at approximately the time the consumer enters a retail location (e.g., entrance 106, shown in FIG. 1). For example, the target image may be captured by biometric input device 104 (shown in FIGS. 1 and 3). In some embodiments, the target image is an iris image of the consumer. Method 400 further includes associating 430 the paying consumer (e.g., consumer 102, shown in FIG. 1) with a payment account using at least the first biometric image and the plurality of biometric data sets (i.e., a "target image"). Method 400 also includes authenticating 440 use of the payment account by the paying consumer during a payment transaction at the retail location by comparing the first biometric image to the plurality of biometric data sets. In some embodiments, authenticating 440 includes authenticating the consumer without use of a physical identification token.

Figure 5:
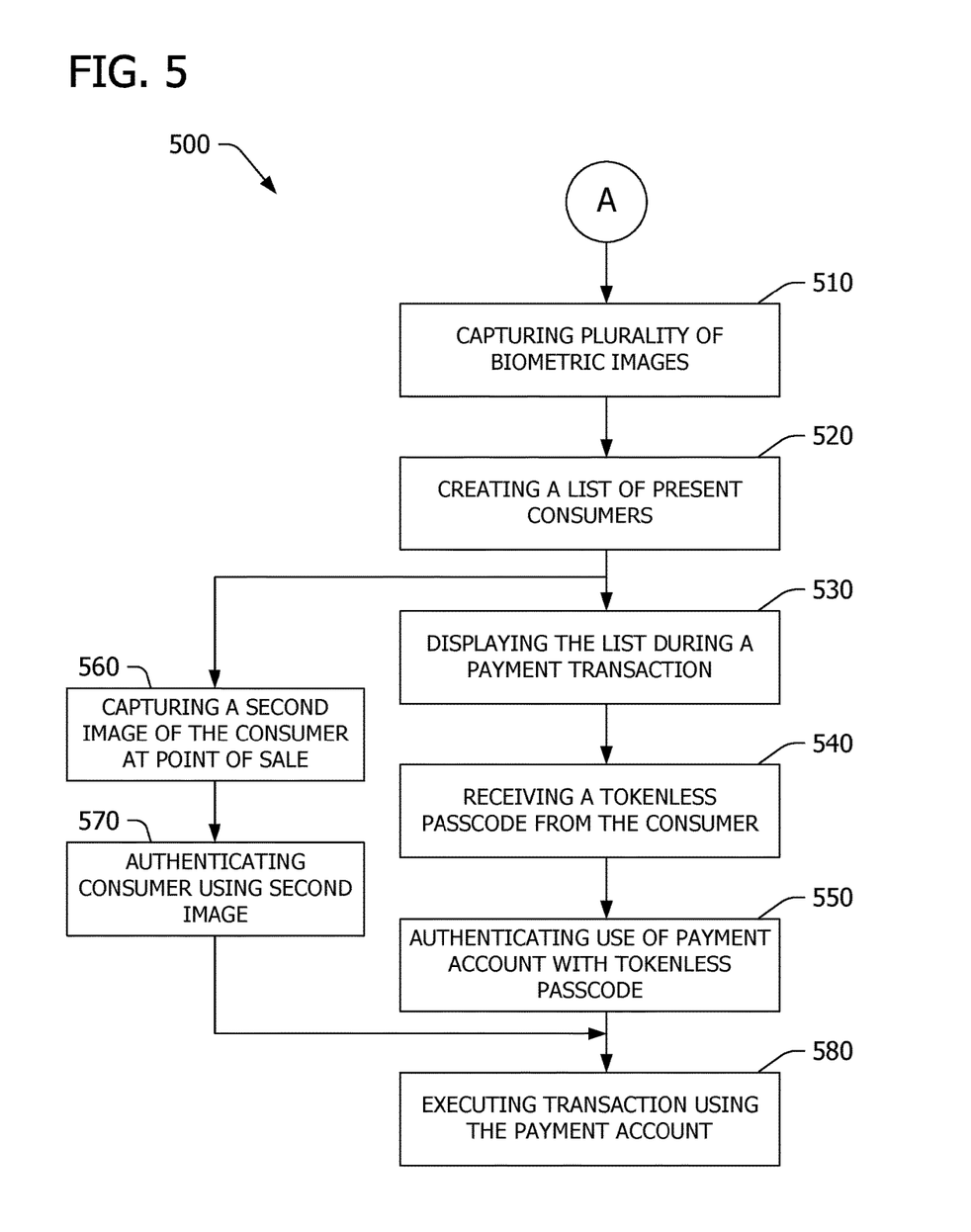
FIG. 5 is another example method for tokenless authentication of consumers during payment transactions implemented using the computing devices shown in FIG. 3.

FIG. 5 is another example method 500 for tokenless authentication of consumers during payment transactions implemented using the computing devices shown in FIGS. 1 and 2. In some embodiments, method 500 further includes capturing 510 a plurality of biometric images from a plurality of consumers, creating 520 a list including the plurality of consumers, the list representing consumers physically present at the retail location, and displaying 530 the list to one of the paying consumer and a salesperson during the payment transaction. Further, in some embodiments, method 500 includes receiving 540 a tokenless passcode from the paying consumer, and included with each biometric data set of the plurality of biometric data sets is an authorized tokenless passcode (i.e., a "master" passcode stored on file with the consumer's account information similar to the master image). Method 500 may also include authenticating 550 use of the payment account by comparing the tokenless passcode to the authorized tokenless passcode associated with the consumer account. Method 500 may also include capturing 560 a second biometric image of the paying consumer at a point of sale of the payment transaction, such as by a second biometric input device (e.g., biometric input device 214, shown in FIG. 2), and authenticating 570 use of the payment account by the paying consumer using at least the second biometric image. In other embodiments, method 500 may also include executing the payment transaction using the identified payment account.

Figure 6:
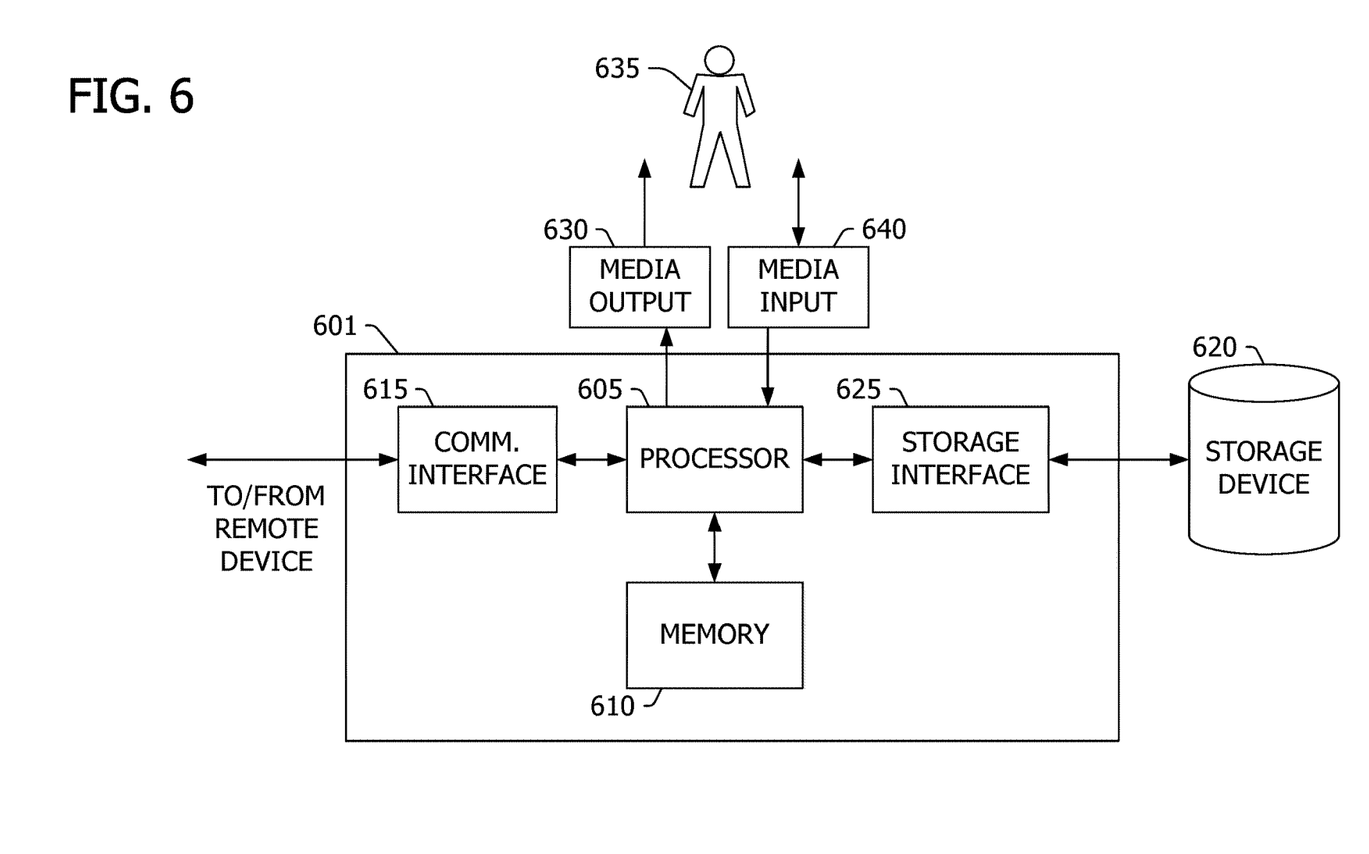
FIG. 6 illustrates an example configuration of a computing system that may be used to perform tokenless authentication of consumers during payment transactions.

FIG. 6 illustrates an example configuration of a computing system 601 that may be used to perform tokenless authentication of consumers during payment transactions. In some embodiments, computing system 601 is similar to backend system 310 (shown in FIG. 3), biometric input devices 104 and 126, and/or point of sales device 120. In the example embodiment, computing system 601 includes a processor 605 for executing instructions. In some embodiments, executable instructions are stored in a memory area 610. Processor 605 may include one or more processing units, for example, a multi-core configuration. Memory area 610 is any device allowing information such as executable instructions and/or written works to be stored and retrieved. Memory area 610 may include one or more computer readable media.

Computing system 601 also includes at least one media output component 630 for presenting information to user 635. Media output component 630 is any component capable of conveying information to user 635. In some embodiments, media output component 630 includes an output adapter such as a video adapter and/or an audio adapter. In some embodiments, media output component 630 may be a log file that includes output describing actions taken by system 601. An output adapter is operatively coupled to processor 605 and operatively couplable to an output device such as a display device, a liquid crystal display (LCD), organic light emitting diode (OLED) display, or "electronic ink" display, or an audio output device, a speaker or headphones.

In some embodiments, computing system 601 includes an input device 640 for receiving input from user 635. Input device 640 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 630 and input device 640. Computing system 601 may also include a communication interface 615, which is communicatively couplable to other computing devices, such as point of sales device 120 (shown in FIG. 1), biometric input devices 104 and 126 (shown in FIG. 1), and/or computing devices within payment network 320 (shown in FIG. 3). Communication interface 615 may include, for example, a wired or wireless network adapter or a wireless data transceiver for use with a wireless network, a mobile phone network, Global System for Mobile communications (GSM), 3G, or other mobile data network or Worldwide Interoperability for Microwave Access (WI-MAX).

Stored in memory area 610 are, for example, computer readable instructions for providing a user interface to user 635 via media output component 630 and, optionally, receiving and processing input from input device 640. A user interface may include, among other possibilities, a web browser and client application. Web browsers enable users, such as user 635, to display and interact with media and other information typically embedded on a web page or a website. A client application allows user 635 to interact with a server application.

Processor 605 may also be operatively coupled to a storage device 620. Storage device 620 is any computer-operated hardware suitable for storing and/or retrieving data. In some embodiments, storage device 620 is integrated in server system 601. For example, computing system 601 may include one or more hard disk drives as storage device 620. In other embodiments, storage device 620 is external to computing system 601 and may be accessed by a plurality of computing systems 601. For example, storage device 620 may include multiple storage units such as hard disks or solid state disks in a redundant array of inexpensive disks (RAID) configuration. Storage device 620 may include a storage area network (SAN) and/or a network attached storage (NAS) system.

In some embodiments, processor 605 is operatively coupled to storage device 620 via a storage interface 625. Storage device 620 may be similar to storage 312 (shown in FIG. 3). Storage interface 625 is any component capable of providing processor 605 with access to storage device 620. Storage interface 625 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 625 with access to storage device 620.

During operation, in the example embodiment, user 635, such as a systems administrator, a consumer 202 (shown in FIG. 2), and/or a salesperson 204 (shown in FIG. 2), uses computing system 601 directly or indirectly during a payment transaction. Computing system 601 performs tokenless authentication of consumers during payment transactions.

Figure 7:
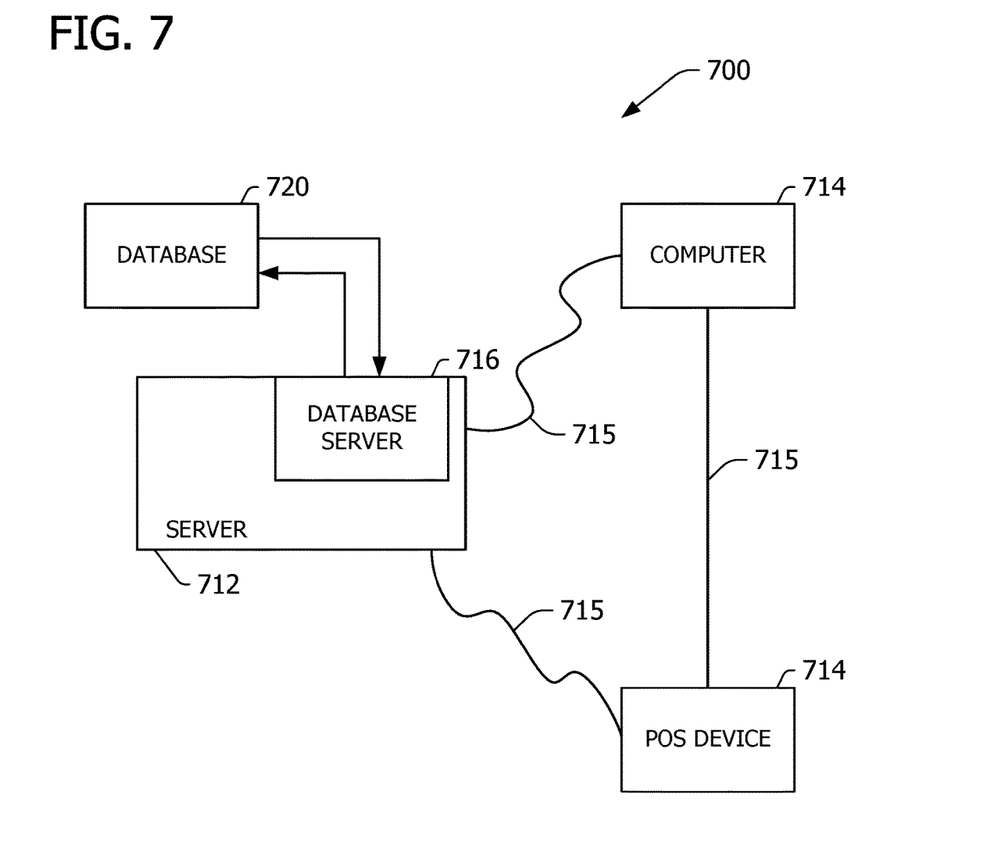
FIG. 7 is a simplified block diagram of an example tokenless authentication system including a plurality of computer devices connected in communication in accordance with the present disclosure.

FIG. 7 is a simplified block diagram of an example tokenless authentication system 700 including a plurality of computer devices connected in communication in accordance with the present disclosure. In the example embodiment, system 700 is used for tokenless authentication of consumers during payment transactions.

More specifically, in the example embodiment, system 700 includes a server system 712, and a plurality of client sub-systems, also referred to as biometric input devices 714, connected to server system 712. In one embodiment, biometric input devices 714 are computing devices similar to biometric input devices 104 and 126 (shown in FIG. 1), and server system 712 is similar to backend server 310 (shown in FIG. 3) and/or computing device 610 (shown in FIG. 6). Biometric input devices 714 may be interconnected to the Internet and/or local networks through many interfaces including a network 715, such as a local area network (LAN) or a wide area network (WAN), wireless network, dial-in-connections, cable modems, special high-speed Integrated Services Digital Network (ISDN) lines, and RDT networks. Biometric input devices 714 could be any device capable of interconnecting to the Internet or other IP-based network.

Further, in the example embodiment, system 700 includes one or more a point of sales devices 710 communicatively coupled to server system 712, biometric input devices 714, and/or payment network 320 (shown in FIG. 3). In one embodiment, point of sales devices 710 are computing systems similar to POS device 120 (shown in FIG. 1) and/or POS device 210 (shown in FIG. 2).

In the example embodiment, a database server 716 operates on server system 712, and is connected to database 720, which contains information on a variety of matters, as described above. In one embodiment, database 720 can be accessed by POS device 710 for purposes of consumer authentication as described herein. In an alternative embodiment, database 720 is stored remotely from server system 712 and may be non-centralized, such as from a plurality of payment networks and/or issuers.

Database 720 may include a single database having separated sections or partitions, or may include multiple databases, each being separate from each other. Database 720 may store biometric images collected over network 715. Database 720 may also store payment transaction data and/or consumer account data associated with consumers and consumer transactions.

Figure 8:
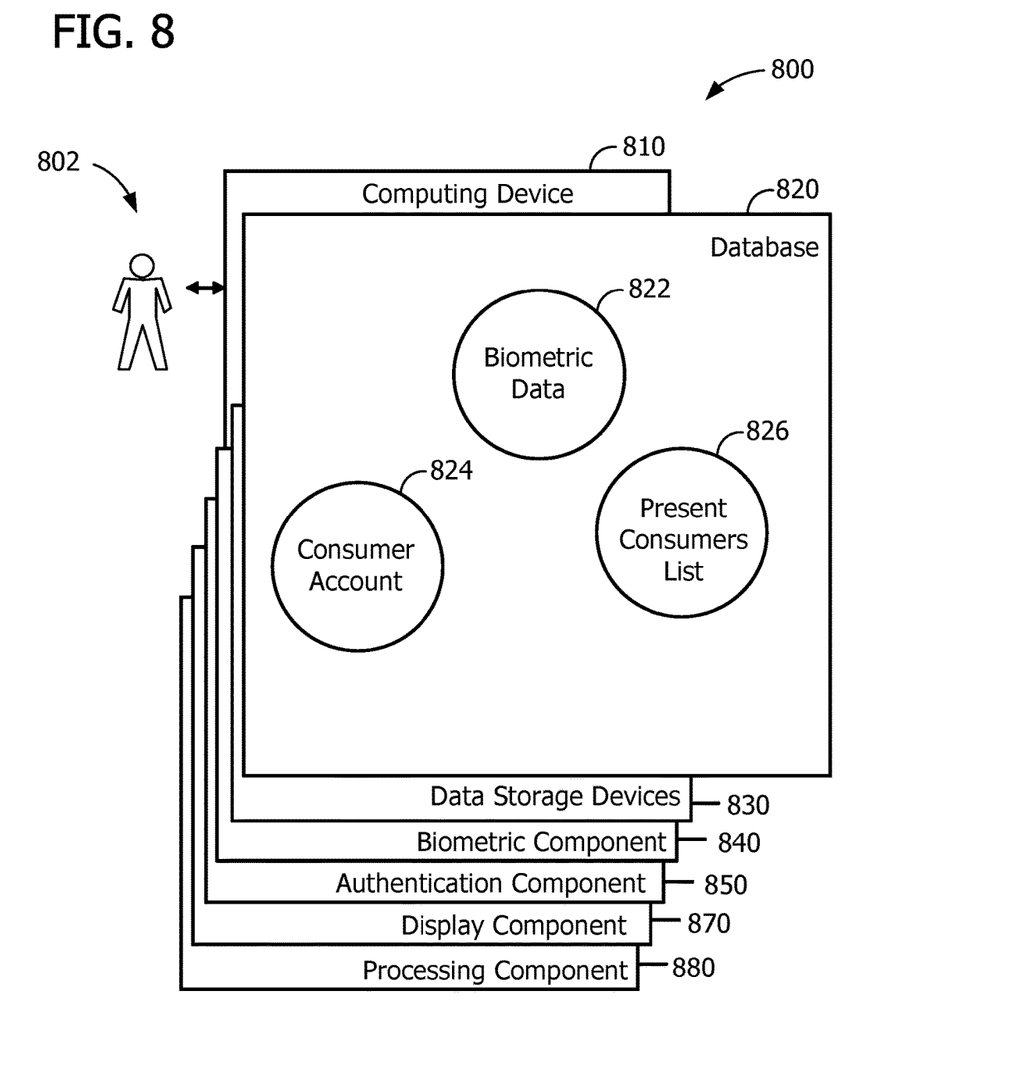
FIG. 8 shows an example configuration of a database within a computing device, along with other related computing components, that may be used to perform tokenless authentication of consumers during payment transactions.

FIG. 8 shows an example configuration of a database within a computing device, along with other related computing components, that may be used to perform tokenless authentication of consumers during payment transactions. In some embodiments, computing device 810 is similar to backend server 310 (shown in FIG. 3), POS device 120 (shown in FIGS. 1 and 2), and/or server system 712 (shown in FIG. 7). Database 820 is coupled to several separate components within computing device 810, which perform specific tasks.

In the exemplary embodiment, database 820 includes biometric data 822, consumer account data 824, and present consumers list 826. In some embodiments, database 820 is similar to database 720 (shown in FIG. 7). Biometric data 822 includes information associated with biometric images, such as target images captured by biometric input devices 104 and 126 (shown in FIG. 1) and/or master images associated with consumer payment accounts. Consumer account data 824 includes data associated with consumers' accounts, such as primary account numbers and names. Present consumers list 826 includes the list of users that have been identified as being currently present in a merchant's store.

Computing device 810 includes database 820, as well as data storage devices 830. Computing device 810 also includes a biometric component 840 for capturing biometric images and/or comparing target images to master images. Computing device 810 also includes an authentication component 850 for verifying a paying consumer during a payment transaction. A display component 870 is also included for interacting with a user 802, such as a consumer or salesperson. A processing component 880 assists with execution of computer-executable instructions associated with the tokenless authentication system.

The above-described embodiments are methods and systems for tokenless authentication of consumers during payment transactions. The system captures biometric images of consumers as they enter a merchant's store and compares these images to a database of biometric master images to identify consumers as physically present within the store. During a payment transaction, the consumer (or a salesperson) is presented with a list of consumers known to be present, the appropriate consumer is selected, and the consumer's payment account number is used for the payment transaction. As a result, the methods and systems described herein facilitate authentication of payment transactions without requiring the consumer to possess a token, such as a physical payment card.

As will be appreciated based on the foregoing specification, the above-described embodiments of the disclosure may be implemented using computer programming or engineering techniques including computer software, firmware, hardware or any combination or subset thereof, wherein the technical effect is receiving a plurality of biometric data sets for a plurality of consumers, each biometric data set including at least a biometric image of a consumer and an associated consumer account identifier, capturing a first biometric image of the paying consumer at approximately the time the consumer enters a retail location, associating the paying consumer with a consumer account using at least the first biometric image and the plurality of biometric data sets, and authenticating use of the consumer account by the paying consumer during a payment transaction at the retail location by comparing the first biometric image to the plurality of biometric data sets. Any such resulting program, having computer-readable code means, may be embodied or provided within one or more computer-readable media, thereby making a computer program product (i.e., an article of manufacture) according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. In other words, the machine-readable medium and the computer-readable medium described herein are non-transitory. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A consumer biometric authentication apparatus, comprising:
    a processing unit configured to authenticate, for a payment transaction executed by a point of sale device at a retail location, a use of a payment account by a visiting consumer physically present at the retail location;
    a memory communicatively coupled to the processing unit, wherein the memory has stored therein (i) a biometric data set for a first consumer, the biometric data set including at least one biometric image of the first consumer, and (ii) a payment account identifier associated with the first consumer;
    a communication interface in operable communication with the processing unit, and configured to (i) receive an iris image of the visiting consumer from an iris recognition device proximate an entrance to the retail location, (ii) transmit the received iris image to the processing unit, wherein the processing unit authenticates the use of the payment account upon matching the received iris image of the visiting consumer with the at least one biometric image of the first consumer, authenticating the visiting consumer as the first consumer; and
    a media output component configured to, upon authentication of the use of the payment account, present identifying information of the first consumer to the point of sale device prior to completion of the payment transaction.

2. The consumer biometric authentication apparatus of claim 1, wherein the biometric data set for the first consumer further includes an authorized tokenless passcode, and wherein the communication interface in operable communication with the processing unit is further configured to:
    receive, from the visiting consumer, a tokenless passcode; and
    transmit the received tokenless passcode to the processing unit, wherein the processing unit authenticates the use of the payment account by comparing the received tokenless passcode to the authorized tokenless passcode associated with the payment account.

3. The consumer biometric authentication apparatus of claim 1, wherein the processing unit is further configured to authenticate the use of the payment account by the visiting consumer without use of any physical identification token.

4. The consumer biometric authentication apparatus of claim 1, wherein the processing unit is further configured to authenticate the use of the payment account by the visiting consumer without use of any physical portable item for storing payment account data.

5. The consumer biometric authentication apparatus of claim 1, wherein the communication interface in operable communication with the processing unit is further configured to:
    receive, from a biometric input device proximate to the point of sale device, a biometric image of the visiting consumer, the biometric input device being different from the iris recognition device; and
    transmit the received biometric image to the processing unit, wherein the processing unit authenticates use of the payment account by the visiting consumer using at least the received biometric image.

6. The consumer biometric authentication apparatus of claim 1, wherein the processing unit is further configured to receive the iris image while the visiting consumer is near a point of entry of the retail location.

7. The consumer biometric authentication apparatus of claim 1, wherein the processing unit is further configured to authenticate the use of the payment account by:
    creating a list of consumers physically present at the retail location based at least in part on a corresponding iris image for each consumer physically entering the retail location, the list including the visiting consumer;
    transmitting the list to the media output component, wherein the media output component presents the list to the point of sale device for display prior to completion of the payment transaction;
    verifying, using the list, that the visiting consumer is at the retail location during the payment transaction; and authenticating the use of the payment account by matching the received iris image of the visiting consumer with the at least one biometric image of the first consumer.

8. The consumer biometric authentication apparatus of claim 1, wherein the identifying information of the first consumer includes at least one of payment account information, a name of the first consumer, and a picture of the first consumer, and wherein the media output component is further configured to:
receive, from the visiting consumer, a tokenless input verifying the identifying information of the first consumer presented to the point of sale device; and
transmit the received tokenless input to the processing unit, wherein the processing unit authenticates the use of the payment account by comparing the received tokenless input to stored information associated with the first consumer.

9. A computer-implemented method to authenticate, for a payment transaction executed by a point of sale device at a retail location, a use of a payment account by a visiting consumer physically present at the retail location, said method implemented using a consumer biometric authentication apparatus having a processor and a memory, said method comprising:
receiving, in the memory, (i) a biometric data set for a first consumer, the biometric data set including at least one biometric image of the first consumer, and (ii) a payment account identifier associated with the first consumer;
receiving an iris image of the visiting consumer from an iris recognition device proximate an entrance to the retail location and in communication with the processor;
authenticating the use of the payment account upon matching the received iris image of the visiting consumer with the at least one biometric image of the first consumer, authenticating the visiting consumer as the first consumer; and
presenting identifying information of the first consumer to the point of sale device prior to completion of the payment transaction.

10. The method of claim 9, wherein the biometric data set for the first consumer further includes an authorized tokenless passcode, and wherein the method further comprises:
receiving, from the visiting consumer, a tokenless passcode; and
authenticating use of the payment account by comparing the tokenless passcode to the authorized tokenless passcode associated with the payment account.

11. The method of claim 9, wherein authenticating the use of the payment account comprises authenticating the visiting consumer without use of any physical identification token.

12. The method of claim 9 further comprising:
receiving, from a biometric input device different from the iris recognition device, a biometric image of the visiting consumer proximate to the point of sale device used for processing the payment transaction; and
authenticating use of the payment account by the visiting consumer using at least the received biometric image.

13. The method of claim 9 further comprising receiving the iris image while the visiting consumer is near a point of entry of the retail location.

14. The method of claim 9, wherein authenticating the use of the payment account further comprises:
creating a list of consumers physically present at the retail location based at least in part on a corresponding iris image for each consumer physically entering the retail location, the list including the visiting consumer;
transmitting the list to the point of sale device for display prior to completion of the payment transaction;
verifying, using the list, that the visiting consumer is at the retail location during the payment transaction; and
authenticating the use of the payment account by matching the received iris image of the visiting consumer with the at least one biometric image of the first consumer.

15. The method of claim 9 wherein the identifying information of the first consumer includes at least one of payment account information, a name of the first consumer, and a picture of the first consumer, and wherein the method further comprises:
receiving, from the visiting consumer, a tokenless input verifying the identifying information of the first consumer presented to the point of sale device; and
authenticating the use of the payment account by comparing the received tokenless input to stored information associated with the first consumer in the memory.

16. A non-transitory computer-readable storage media having computer-executable instructions embodied thereon for authenticating a use of a payment account during a payment transaction executed by a point of sale device at a retail location by a visiting consumer physically present at the retail location, wherein when executed by at least one processor of a computing device, the computer-executable instructions cause the at least one processor to:
receive (i) a biometric data set for a first consumer, the biometric data set including at least one biometric image of the first consumer, and (ii) a payment account identifier associated with the first consumer;
receive an iris image of the visiting consumer from an iris recognition device proximate an entrance to the retail location and in communication with the processor;
authenticate the use of the payment account upon matching the received iris image of the visiting consumer with the at least one biometric image of the first consumer, authenticating the visiting consumer as the first consumer; and
present identifying information of the first consumer to the point of sale device prior to completion of the payment transaction.

17. The computer-readable storage media of claim 16, wherein the biometric data set for the first consumer further includes an authorized tokenless passcode, and wherein the computer-executable instructions further cause the at least one processor to:
receive, from the visiting consumer, a tokenless passcode; and
authenticate use of the payment account by comparing the tokenless passcode to the authorized tokenless passcode associated with the payment account.

18. The computer-readable storage media of claim 16, wherein the computer-executable instructions further cause the at least one processor to authenticate the visiting consumer without use of any physical identification token.

19. The computer-readable storage media of claim 16, wherein the computer-executable instructions further cause the at least one processor to:
receive, from a biometric input device different from the iris recognition device, a biometric image of the visiting consumer proximate to a point of sale of the payment transaction; and
authenticate use of the payment account by the visiting consumer using at east the received biometric image.

20. The computer-readable storage media of claim 16, wherein the computer-executable instructions further cause the at least one processor to authenticate the visiting consumer by:

creating a list of consumers physically present at the retail location based at least in part on a corresponding iris image for each consumer physically entering the retail location, the list including the visiting consumer;

transmitting the list to the point of sale device for display prior to completion of the payment transaction;

verifying, using the list, that the visiting consumer is at the retail location during the payment transaction; and authenticating the use of the payment account by matching the received iris image of the visiting consumer with the at least one biometric image of the first consumer.

* * * * *